United States Patent
Datta et al.

(10) Patent No.: US 6,329,457 B1
(45) Date of Patent: Dec. 11, 2001

(54) CURE PARAMETERS IN RUBBER VULCANIZATION

(75) Inventors: Rabindra Nath Datta, Deventer; Martinus Gerhardus Johannes Hondeveld, Raalte, both of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 08/750,375

(22) PCT Filed: May 24, 1995

(86) PCT No.: PCT/EP95/01999

§ 371 Date: Dec. 6, 1996

§ 102(e) Date: Dec. 6, 1996

(87) PCT Pub. No.: WO95/34601

PCT Pub. Date: Dec. 21, 1995

(30) Foreign Application Priority Data

Jun. 14, 1994 (EP) .................................................. 94201701

(51) Int. Cl.$^7$ .............................. C08K 5/09; C08K 5/34; C08J 3/24
(52) U.S. Cl. .......................... 524/270; 524/274; 525/139; 525/141
(58) Field of Search .................................... 524/270, 273, 524/274, 292; 525/134, 139, 140, 141

(56) References Cited

U.S. PATENT DOCUMENTS

| | | |
|---|---|---|
| 2,373,041 | 4/1945 | Martindell et al. . |
| 2,422,156 | 6/1947 | Wolf et al. . |
| 3,250,733 * | 5/1966 | Giller ..................................... 525/141 |
| 4,131,634 * | 12/1978 | Paulen .................................... 525/141 |
| 4,373,041 | 2/1983 | Wood et al. ............................. 524/77 |
| 5,153,248 | 10/1992 | Wideman et al. ..................... 524/105 |

FOREIGN PATENT DOCUMENTS

| | | | |
|---|---|---|---|
| 738500 | 7/1966 | (CA) . | |
| 1 302 983 | 1/1973 | (GB) ............................... | C08C/9/18 |
| 2 044 786 | 10/1980 | (GB) ............................. | C08G/75/00 |
| WO 92/07828 | 5/1992 | (WO) ........................ | C07D/207/408 |
| WO 92/07904 | 5/1992 | (WO) .......................... | C08K/5/3415 |

OTHER PUBLICATIONS

W. Hoffman, "*Rubber Technology Handbook*", Chapter 4, Rubber Chemicals and additives, pp. 217–353,Hanser Publishers, Munich 1989.
J. M. Collins et al., Trans. Inst. Rubber Ind. 40, No. 6, 1964, *Relevance of Elastic and Loss Moduli of Tyre Components to Tyre Energy Losses*.
Journal of Polymer Science: Polymer Chemistry Edition, vol., 19, 452–475 (1981), *The Synthesis of Biscitraconimides and Polybiscitraconimides*.
Journal of Polymer Science: Polymer Chemistry Edition, vol. 20, 233–239 (1982), *The Synthesis of Bisitacoamic Acids and Isomeric Bisimide Monomers*.
Journal of Polymer Science: Polymer Chemistry Edition, vol. 16, 137–153 (197), Synthesis of N–Substituted Bisitaconimide Monomers for Use as Thermosetting Polyimide Resins.
*International Search Report*, dated Sep. 22, 1995.

* cited by examiner

*Primary Examiner*—Christopher Henderson
(74) *Attorney, Agent, or Firm*—Lainie E. Parker; Ralph J. Mancini

(57) ABSTRACT

A vulcanized rubber composition which comprises the vulcanization reaction product of 100 parts by weight of at least one natural or synthetic rubber; 0.1 to 25 parts by weight of sulfur and/or a sufficient amount of a sulfur donor to provide the equivalent of 0.1 to 25 parts by weight of sulfur; 10–100 parts by weight of at least one silica filler; 0.1 to 5 parts by weight of at least one anti-reversion coagent comprising at least two groups selected from citraconimide and/or itaconimide groups; and a sufficient amount of a least one cure-improving resin to significantly increase the delta torque of the rubber composition during the vulcanization process as compared to the delta torque of a similar rubber composition in the absence of the cure-improving resin, is disclosed. Also disclosed is a process for the vulcanization of this rubber composition, and articles of manufacture comprising the vulcanized rubber composition. The invention is useful for the partial or complete replacement of silane coupling agents in silica-filled rubber compositions.

12 Claims, No Drawings

CURE PARAMETERS IN RUBBER VULCANIZATION

This invention relates to a vulcanized rubber composition having improved physical and mechanical properties and which exhibits improved cure parameters during the vulcanization process. More particularly, it relates to a rubber composition which is vulcanized in the presence of an anti-reversion coagent and a sufficient amount of resin to improve the cure parameters of the vulcanized rubber composition during vulcanization. The invention also relates to a vulcanization process which is carried out in the presence of an anti-reversion coagent and a cure-improving resin and the use of an anti-reversion coagent in combination with a cure-improving resin to replace, in part, silane coupling agents in vulcanizeable rubber compositions. Finally, the invention also relates to rubber products comprising rubber vulcanized in the presence of an anti-reversion coagent and a cure-improving resin.

In the tire and belt industries, among others, a better resistance to reversion is being demanded. This curing characteristic results in improved mechanical and heat resistance properties. In addition, it is typical to employ a silane coupling agent in order to improve the coupling of silica fillers with rubber compositions during the vulcanization thereof. However, these silane coupling agents are expensive, they decrease the processing safety of the rubber by decreasing the scorch time, and these compounds are generally considered to be toxic. Thus, there is a desire in the rubber industry to replace or eliminate these silane coupling agents either wholly or partially.

It has been observed that the sulfur-vulcanization of a composition comprising a rubber and an anti-reversion coagent comprising at least two groups selected from citraconimide and/or itaconimide groups results in a substantial reduction in the reversion of sulfur-vulcanized rubber compositions. This concept is generally disclosed in PCT patent applications WO 92/07904 and 92/07828.

However, these sulfur-vulcanized rubber products still require a significant quantity of silane coupling agents to improve the coupling between the silica fillers and the rubber.

It is therefore the primary object of the present invention to improve upon the compositions disclosed by WO 92/07904 and 92/07828 by providing a resin which will solve some of the problems associated with silane coupling agents by allowing partial replacement of these agents with a cure-improving resin. It has been found that the presence of these resins during vulcanization of rubber with an anti-reversion coagent results in improved cure parameters as well as excellent physical and mechanical properties.

For example, the scorch time ($t_s2$) is increased whereas the vulcanization time ($T_{90}$) is decreased, as compared to similar compositions employing standard quantities of silane coupling agents thereby leading to better process safety and faster production times. The combination of the cure-improving resin and the anti-reversion agent also leads to excellent anti-reversion properties, improved dynamic properties such as blow out times and improved heat resistance.

Accordingly, the present invention relates to a vulcanized rubber composition which comprises the vulcanization reaction product of a composition containing at least:

A) 100 parts by weight of at least one natural or synthetic rubber;
B) 0.1 to 25 parts by weight of sulfur and/or a sufficient amount of a sulfur donor to provide the equivalent of 0 to 25 parts by weight of sulfur;
C) 10–100 parts by weight of at least one silica filler,
D) 0.1 to 5 parts by weight of at least one anti-reversion coagent comprising at least two groups selected from citraconimide and/or itaconimide groups; and
E) a sufficient amount of at least one cure-improving resin to significantly increase the delta torque of the rubber composition during the vulcanization process as compared to the delta torque of a similar rubber composition in the absence of the cure-improving resin.

In Canadian Patent No. 738,500 the vulcanization of rubbers in the absence of sulfur, with either bis-maleimides or bis-citraconimides, is disclosed. This process had, for its purpose, to be an alternative to sulfur-vulcanization processes. However, the rubber products made by the process of this patent suffer from the usual disadvantages of peroxide-cured rubbers such as low tensile strength and significant deterioration in other important properties.

U.S. Pat. No. 5,153,248 discloses that certain aromatic bismaleimides function as a coupling agent in silica filled sulfur vulcanized rubber compounds. These bismaleimides are used to replace conventional silane coupling agents. Also disclosed are sulfur-vulcanizeable rubber compositions employing these aromatic bismaleimides as coupling agents.

In addition, U.S. Pat. No. 4,373,041 teaches that tackifying resins such as rosin esters (i.e. colophony), can be used as promoters for silica-filled rubbers to decrease hysteresis. These tackifying resins serve as reinforcing promoters to aid in the bonding of silica fillers to rubber upon curing thereby resulting in the improved hysteresis. The patent further indicates that the use of silane coupling agents in combination with the tackifying resins and silica fillers is desirable.

Finally, British patent 1,302,983 discloses that the addition of colophony to rubbers compositions containing carbon black and silica fillers in order to improve the resistance to hysteresis in these rubbers.

The present inventors have found that the unique combination of certain cure-improving resins and an anti-reversion agent lead to significant, unexpected improvements in the cure parameters and physical properties of sulfur-vulcanized rubbers which contain silica fillers.

The present invention is applicable to all natural and synthetic rubbers. Examples of such rubbers include, but are not limited to, natural rubber, styrene-butadiene rubber, butadiene rubber, isoprene rubber, acrylonitrile-butadiene rubber, chloroprene rubber, isoprene-isobutylene rubber, brominated isoprene-isobutylene rubber, chlorinated isoprene-isobutylene rubber, ethylene-propylene-diene terpolymers, as well as combinations of two or more of these rubbers and combinations of one or more of these rubbers with other rubbers and/or thermoplastics.

The anti-reversion coagents used in the present invention comprise at least two groups selected from citraconimide and itaconimide. More preferably, the anti-reversion coagents are compounds represented by the general formula II:

$$Q_1-D-(Q_2)_p \qquad \text{(II);}$$

wherein D, optionally containing one or more groups selected from nitrogen, oxygen, silicon, phosphorus, boron, sulphone, sulphoxy, polysulfide and sulfur, is a monomeric or oligomeric divalent, trivalent or tetravalent group, p is an integer selected from 1, 2 or 3, $Q_1$ and $Q_2$ are independently selected from the formulas III and IV:

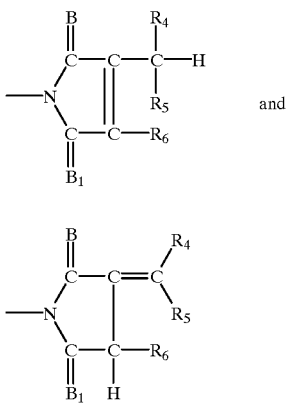

wherein $R_4$, $R_5$ and $R_6$ are independently selected from hydrogen, $C_1$–$C_{18}$ alkyl groups, $C_3$–$C_{18}$ cycloalkyl groups, $C_6$–$C_{18}$ aryl groups, $C_7$–$C_{30}$ aralkyl groups and $C_7$–$C_{30}$ alkaryl groups and $R_5$ and $R_6$ may combine to form a ring when $R_4$ is hydrogen; B and $B^1$ are independently selected from oxygen and sulfur.

The imides used in the present invention are, in general, known compounds and may be prepared by the methods disclosed in, Galanti, A. V. et al., J. Pol. Sc.: Pol. Chem. Ed., Vol. 19, pp. 451–475, (1981); Galanti, A. V. et al., J. Pol. Sc.: Pol. Chem. Ed., Vol. 20, pp. 233–239 (1982); and Hartford, S. L. et al., J. Pol. Sc.: Pol. Chem. Ed., Vol. 16, pp. 137–153, 1978, the disclosures of which are hereby incorporated by reference.

The imide compounds useful in the present invention and represented by the formula II are, more preferably, the biscitraconimides wherein $Q_1$ and $Q_2$ are of the formula III, $R_4=R_5=R_6=H$, p=1 and $B=B^1$=oxygen; the bisitaconimides wherein $Q_1$ and $Q_2$ are of the formula IV, $R_4=R_5=R_6=H$, p=1 and $B=B^1$=oxygen; the mixed citraconimide and itaconimide wherein $Q_1$ is of the formula III, $Q_2$ is of the formula IV, $R_4=R_5=R_6=H$, p=1 and $B=B^1$=oxygen; and mixtures of the above-mentioned compounds.

More specifically, the group D mentioned in the formula II can be a monomeric divalent, trivalent or tetravalent linear or branched radical chosen from a $C_1$–$C_{18}$ alkyl, $C_2$–$C_{18}$ alkenyl, $C_2$–$C_{18}$ alkynyl, $C_3$–$C_{18}$ cycloalkyl, $C_3$–$C_{18}$ polycycloalkyl, $C_6$–$C_{18}$ aryl, $C_6$–$C_{30}$ polyaryl, $C_7$–$C_{30}$ aralkyl, $C_7$–$C_{30}$ alkaryl, oligomers of one or more of these radicals, and which radicals may optionally contain one or more groups selected from oxygen, nitrogen, silicon, phosphorus, sulfur, polysulfide, sulphone, sulfoxy and boron, all of which radicals may also be optionally substituted at one or more of the atoms in the radical with a substituent selected from oxygen, nitrogen, silicon, $SiO_2$, sulfoxy, boron, sulfur, phosphorus, amido, imino, azo, diazo, hydrazo, azoxy, alkoxy, hydroxy, iodine, fluorine, bromine, chlorine, carbonyl, carboxy, ester, carboxylate, $SO_2$, $SO_3$, sulphonamido, $SiO_3$, nitro, imido, thiocarbonyl, cyano, and epoxy groups.

More specific examples of some of the imide compounds useful in the present invention can be found in international patent application publication numbers WO 92107904 and 92/07828, the disclosures of which are hereby incorporated by reference.

The cure-improving resins of the present invention are characterized by the fact that they provide a significant increase in the delta torque of the rubber composition during the vulcanization process as compared to the delta torque of a similar rubber composition in the absence of the cure-improving resin. The preferred cure-improving resins of the present invention are colophony and phenol/formaldehyde resins.

Important to note is that a wide range of so-called, "tackifying" resins were tested in the sulfur-vulcanization of rubber and it was found that only a select few of these resins provided the significant increase in the delta torque which characterizes the present invention. Thus, the broad general teachings of the prior art to use tackifying resins are insufficient to lead the man of skill in the art to the present invention since he must make a selection from the known class of tackifying resins and the prior art contains no indications, leading to the proper selection.

The rubber composition of the present invention is sulfur-vulcanized. More particularly, 0.1 to 25 parts by weight of sulfur and/or a sufficient amount of a sulfur donor to provide the equivalent of 0.1 to 25 parts by weight of sulfur is present in the composition.

Examples of sulfur which may be used in the present invention include various types of sulfur such as powdered sulfur, precipitated sulfur and insoluble sulfur. Also, sulfur donors may be used in place of, or in addition to sulfur in order to provide the required level of sulfur during the vulcanization process. Examples of such sulfur donors include, but are not limited to, tetramethylthiuram disulfide, tetraethylthiuram disulfide, tetrabutylthiuram disulfide, tetrabenzylthiuram disulfide, dipentamethylene thiuram hexasulfide, dipentamethylene thiuram tetrasulfide, dithiodimorpholine, caprolactam disulfide, dialkylthiophosphoryl disulfide and mixtures thereof.

The amount of sulfur which may be compounded with the rubber is, based on 100 parts of rubber, preferably 0.1 to 25 parts by weight, and more preferably 0.2 to 8 parts by weight. The amount of sulfur donor which may be compounded with the rubber is an amount sufficient to provide an equivalent amount of sulfur which is the same as if sulfur itself were used.

The amount of anti-reversion coagent to be compounded with the rubber is, based on 100 parts of rubber, 0.1 to 5 parts by weight, and more preferably 0.2 to 3 parts by weight. The amount of cure-improving resin employed is 0.1–25 parts by weight, more preferably 0.5–10 parts by weight and, most preferably 1.0–5.0 parts by weight.

These ingredients may be employed as a pre-mix, or added simultaneously or separately, and they may be added together with other rubber compounding ingredients as well.

The compositions of the present invention may also optionally contain from 0.1–2.0 parts by weight of a silane coupling agent, for conventional tire compositions and somewhat higher amounts for the so-called, "green tire" compositions. An important advantage of the present invention is that it provides a means for at least partially replacing the conventional amount of silane coupling agent and thus allows one to use less silane coupling agent than would normally be required.

In a preferred embodiment of the present invention, an additional component is employed to further improve the properties of the vulcanized rubber composition. In particular, 0.1 to 25 parts by weight of at least one sulfide resin of the general formula $HZ_1$—[—$S_x$—$Z_2$—]$_n$—$S_x$—$Z_3H$, wherein $Z_1$, $Z_2$, and $Z_3$ are independently selected from linear or branched $C_{1-18}$ alkylene groups, $C_{2-18}$ alkenylene groups, $C_{2-18}$ alkynylene groups, $C_{6-18}$ arylene groups, $C_{7-30}$ alkarylene groups, $C_{7-30}$ aralkylene groups, $C_{3-18}$ cycloalkylene groups, optionally containing one or more hetero atoms; optionally substituted with hydroxy, amino, thiol, and halogen groups; each x is independently selected from an integer of 1 to 10; and n is an integer from 1 to 100; is employed.

Each sulfide link $S_x$ in the above-mentioned general formula may be a linear linkage of sulfur atoms, such as —S—, —S—S—, —S—S—S—, etc., but also

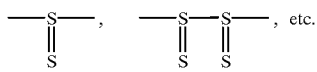

In a preferred embodiment the sulfide resin is of the following formula (I)

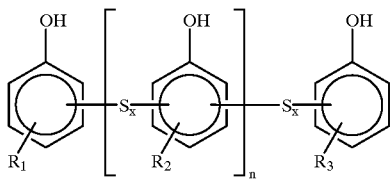

wherein $R_1$, $R_2$, and $R_3$ are independently selected from linear or branched $C_{1-10}$ alkyl groups, each x is independently selected from an integer of 1 to 10, and n is an integer from 1 to 100. $R_1$, $R_2$, and $R_3$ are preferably tertiary alkyl groups, meta- or para-substituted on the aromatic group with respect to the hydroxy group. More preferably, $R_1$, $R_2$, and $R_3$ are para-substituted with respect to the hydroxy group. The sulfide resin is then a para-tertiary alkyl phenol sulfide.

In U.S. Pat. No. 2,422,156 the preparation of para-tertiary alkyl phenol sulfides is described starting from para-tertiary alkyl phenol and a sulfide compound, such as sulfur dichloride or sulfur monochloride. The symbol x in formula (I) depends upon how much sulfur is introduced in the reaction. Using sulfur dichloride, x would be 1, using sulfur monochloride, x would be 2. If a tri- or higher sulfide is desired the product can be further reacted with elemental sulfur.

Examples of para-tertiary alkyl phenol sulfide include the Vultac® compounds, ex. Pennwalt, which are para-tertiary amyl phenol disulfides. $R_1$, $R_2$, and $R_3$ are then tertiary amyl groups. The exact structure of these products is not known. It is believed that they are complex mixtures of sulfide resins, comprising mono-, di-, and polysulfide linkages.

The amount of sulfide resin to be compounded with the rubber is, based on 100 parts of rubber, 0.1 to 8 parts. More preferably, 0.2 to 1.5 parts of sulfide resin per 100 parts of rubber are employed.

In most circumstances it is also desirable to have a vulcanization accelerator in the rubber compound. Conventional, known vulcanization accelerators may be employed. The preferred vulcanization accelerators include mercaptobenzothiazole, 2,2'-mercaptobenzothiazole disulfide, sulfenamide accelerators including N-cyclohexyl-2-benzothiazole sulfenamide, N-tertiary-butyl-2-benzothiazole sulfenamide, N,N'-dicyclohexyl-2-benzothiazole sulfenamide, and 2-(morpholinothio) benzothiazole; thiophosphoric acid derivative accelerators, thiurams, dithiocarbamates, diphenyl guanidine, diortho-tolyl guanidine, dithiocarbamylsulfenamides, xanthates, triazine accelerators and mixtures thereof.

When the vulcanization accelerator is employed, quantities of from 0.1 to 8 parts by weight, based on 100 parts by weight of rubber composition, are used. More preferably, the vulcanization accelerator comprises 0.3 to 4 parts by weight, based on 100 parts by weight of rubber.

Other conventional rubber additives may also be employed in their usual amounts. For example, reinforcing agents such as carbon black, clay, whiting and other mineral fillers, as well as mixtures of fillers, may be included in the rubber composition. Other additives such as process oils, waxes, antioxidants, antiozonants, pigments, resins, plasticizers, process aids, factice, compounding agents and activators such as stearic acid and zinc oxide may be included in conventional, known amounts. For a more complete listing of rubber additives which may be used in combination with the present invention see, W. Hofmann, "Rubber Technology Handbook", Chapter 4, Rubber Chemicals and Additives, pp. 217–353, Hanser Publishers, Munich 1989.

Further, scorch retarders such as phthalic anhydride, pyromellitic anhydride, benzene hexacarboxylic trianhydride, 4-methylphthalic anhydride, trimellitic anhydride, 4-chlorophthalic anhydride, N-cyclohexyl-thiophthalimide, salicylic acid, benzoic acid, maleic anhydride and N-nitrosodiphenylamine may also be included in the rubber composition in conventional, known amounts. Finally, in specific applications it may also be desirable to include steel-cord adhesion promoters such as cobalt salts and dithiosulfates in conventional, known quantities.

The present invention also relates to a vulcanization process which comprises the step of vulcanizing 100 parts of at least one natural or synthetic rubber in the presence of 0.1–5 parts by weight of an antireversion coagent and 0.1–25 parts by weight of a cure-improving resin.

The process is carried out at a temperature of 110–220° C. over a period of up to 24 hours. More preferably, the process is carried out at a temperature of 120–190° C. over a period of up to 8 hours in the presence of 0.1–25 parts by weight of sulfur and/or sulfur donor to provide the equivalent of 0.1 to 25 parts by weight of sulfur, 0.1 to 5 parts by weight of anti-reversion coagent and 0.1 to 8 parts by weight of a cure-improving resin. Even more preferable is the use of 0.2–8 parts by weight of sulfur and/or sulfur donor, 0.2–3 parts by weight of anti-reversion coagent and 0.2–1.5 parts by weight of a cureimproving resin. All of the additives mentioned above with respect to the rubber composition may also be present during the vulcanization process of the invention.

In a more preferred embodiment of the vulcanization process, the vulcanization is carried out at a temperature of 120–190° C. over a period of up to 8 hours and in the presence of 0.1 to 8 parts by weight, based on 100 parts by weight of rubber, of at least one vulcanization accelerator.

In another preferred embodiment of the vulcanization process, the anti-reversion coagent is selected from a compound of the formula II.

The present invention also comprises the use of an anti-reversion coagent in combination with a cure-improving resin in a process for the vulcanization of rubber.

Finally, the present invention also includes articles of manufacture, such as tires, belts or inner tubes which comprise vulcanized rubber which is vulcanized in the presence of an anti-reversion coagent and a The present invention also relates to a vulcanization process which comprises the step of vulcanizing 100 parts of at least one natural or synthetic rubber in the presence of 0.1–5 parts by weight of an anti-reversion coagent and 0.1–25 parts by weight of a sulfide resin.

The process is carried out at a temperature of 110–220° C. over a period of up to 24 hours. More preferably, the process is carried out at a temperature of 120–190° C. over a period of up to 8 hours in the presence of 0.1–25 parts by weight of sulfur and/or sulfur donor to provide the equivalent of 0.1 to 25 parts by weight of sulfur, 0.1 to 5 parts by weight of anti-reversion coagent and 0.1 to 8 parts by weight of a cure-improving resin. Even more preferable is the use of 0.2–8 parts by weight of sulfur and/or sulfur donor, 0.2–3 parts by weight of anti-reversion coagent and 0.2–1.5 parts by weight of a cure-improving resin. All of the additives mentioned above with respect to the rubber composition may also be present during the vulcanization process of the invention.

In a more preferred embodiment of the vulcanization process, the vulcanization is carried out at a temperature of 120–190° C. over a period of up to 8 hours and in the presence of 0.1 to 8 parts by weight, based on 100 parts by weight of rubber, of at least one vulcanization accelerator.

In another preferred embodiment of the vulcanization process, the anti-reversion coagent is selected from a compound of the formula II.

The present invention also comprises the use of an anti-reversion coagent in combination with a cure-improving resin in a process for the vulcanization of rubber.

Finally, the present invention also includes articles of manufacture, such as tires, belts or inner tubes which comprise vulcanized rubber which is vulcanized in the presence of an anti-reversion coagent and a cure-improving resin. More particularly, the compositions of the present invention can be used in tire treads for truck tires and off-the-road tires, in particular, for sidewalls, for tire carcasses and for steel-cord skim stocks. In belts, the rubber compositions of the present invention are particularly useful for conveyor belts and V-belts which are subjected to high loading and abrasion in service.

The invention is further illustrated by the following examples which are not to be construed as limiting the invention in any way. The scope of the invention is to be determined from the claims appended hereto.

EXPERIMENTAL METHODS USED IN THE EXAMPLES

Compounding, Vulcanization and Characterization of Compounds

In the following examples, rubber compounding, vulcanization and testing was carried out according to standard methods except as otherwise stated:

Base compounds were mixed in a Werner & Pfleiderer mixer (volume 5.0 liter; 70% load factor; preheating at 50° C.; rotor speed 30 rpm; mixing time 6 min).

Vulcanization ingredients and coagents were added to the compounds on a Schwabenthan Polymix 150L two-roll mill (friction 1:1.22, temperature 50°–70° C., mixing time 10 min).

Cure characteristics were determined using a Monsanto rheometer MDR 2000E (range 2.5–3 Nm/arc 0.5°, ISO 6502-91): delta torque or extent of crosslinking (R∞) is the maximum torque (MH, also denoted as initial torque maximum, ($T_i$) minus the minimum torque (ML). Scorch safety ($t_s2$) is the time to 2% of delta torque above minimum torque (ML), optimum cure time ($t_{90}$) is the time to 90% of delta torque above minimum.

Sheets and test specimens were vulcanized by compression molding in a Fontyne TP-400 press at 150° C. for $t_{90}$ and 60 minutes.

Tensile measurements were carried out using a Zwick 1445 tensile tester (ISO-37/2 dumbbells).

Hardness was determined according to ISO 2783 (°Shore A), and ISO 48 (IRHD).

Sheets and test specimens were vulcanized by compression moulding in a Fontyne TP-400 press at 150° C. or 170° C. for a definite period as indicated in the respective tables.

Tensile stress-strain properties were determined according to ISO 37/2, tear strength as per ISO 34, DIN abrasion as per ISO 4649 and fatigue to failure and hardness according to ASTM 4482/85 and ISO 48 respectively.

Ageing of the test specimens was carried out in a ventilated oven in the presence of air at 100° C. for 1 day or for 3 days (ISO 188).

Heat buildup and permanent set after dynamic loading were determined using a Goodrich Flexometer (Load 11 kg or 22 kg, for blow out; stroke 0.445 cm, frequency 30 Hz, start temperature 100° C., running time 25 min, 1 h or 2 h, as indicated in the respective tables, ISO 4666/3-1982).

Dynamic mechanical analysis was carried out using a RDA-700 (prestrain 0.75%, frequency 15 Hz at 60° C. or 1 Hz at 0°, ASTMO 2231). Storage modulus (G'), loss modulus (G"), and loss tangent (tanδ) are measured by dynamic mechanical analysis. Increased storage modulus (G') and decreased loss tangent (tanδ) result in a lower loss compliance (tanδ/G'=J") which leads to improved tire properties such as reduced rolling resistance (J. M. Collins et al., Trans. Inst. Rubber Ind. 40, T239, 1964), which by consequence leads to fuel savings during service.

Examples 1–3 and Comparative Examples A–C

In these examples, the effects of the resins colophony and coumarin (comparative) are demonstrated with the colophony also being tested with and without the BCI-MX coagent (meta-xylene biscitraconimide). In addition, Example 3 also includes a sulfide resin additive.

TABLE 1

| | Compound Composition | | | | | |
|---|---|---|---|---|---|---|
| Example | A | B | C | 1 | 2 | 3 |
| Natural Rubber SMR 10 | 100 | 100 | 100 | 100 | 100 | 100 |
| Carbon Black N-220 | 40 | 40 | 40 | 40 | 40 | 40 |
| Perkasil ®KS 404 pd | 20 | 20 | 20 | 20 | 20 | 20 |
| Stearic Acid | 2 | 2 | 2 | 2 | 2 | 2 |
| ZnO | 5 | 5 | 5 | 5 | 5 | 5 |
| Harzsiegel ® St. Ar. Oil | 3 | 3 | 3 | 3 | 3 | 3 |
| Ingralen ® 150 Resin Cumar. B1/85 ® | 3 | 3 | — | — | — | — |
| Resin Kolophonium | — | — | 3 | 3 | 3 | 3 |
| Coupl.Ag.Si-69 | — | 3 | — | — | 1 | 1 |
| Permanax ® TQ pts | 1.5 | 1.5 | 1.5 | 1.5 | 1.5 | 1.5 |
| Permanax ® 6PPD pts | 2.5 | 2.5 | 2.5 | 2.5 | 2.5 | 2.5 |
| Wax Sunolite ® 240 | 1.0 | 1.0 | 1.0 | 1.0 | 1.0 | 1.0 |
| Perkacit ® CBS c | 1.41 | 1.41 | 1.41 | 1.41 | 1.41 | 1.41 |
| Perkacit ® DPG c | 1.0 | 1.0 | 1.0 | 1.0 | 1.0 | 1.0 |
| Sulphur | 1.43 | 1.43 | 1.43 | 1.43 | 1.43 | 1.43 |
| S-donor Vultac ®710 | — | — | — | — | — | 0.5 |
| Coagent BCI-MX | — | — | — | 1.0 | 1.0 | 0.5 |

TABLE 2

Rheological data

| Example | | A | B | C | 1 | 2 | 3 |
|---|---|---|---|---|---|---|---|
| Visc.ML(1 + 4) 100° C. | MU* | 94 | 85 | 87 | 87 | 85 | 85 |
| Scorch MS 121° C. | min | 16 | 10 | 19 | 19 | 16 | 17 |
| Test temperature | ° C. | 150 | 150 | 150 | 150 | 150 | 150 |
| Rheometer ts2 | min | 2.5 | 1.7 | 3.0 | 3.0 | 2.7 | 2.5 |
| t90 | min | 5.4 | 11.0 | 6.9 | 7.0 | 8.9 | 7.9 |
| ML | Nm | 0.23 | 0.25 | 0.25 | 0.23 | 0.25 | 0.15 |
| Delta torque | Nm | 1.55 | 1.85 | 1.56 | 1.53 | 1.75 | 1.82 |
| Test temperature | ° C. | 170 | 170 | 170 | 170 | 170 | 170 |
| Rheometer ts2 | min | 0.8 | 0.6 | 1.0 | 1.0 | 0.9 | 0.9 |
| t5 | min | 0.7 | 0.5 | 0.8 | 0.8 | 0.8 | 0.7 |
| t90 | min | 1.5 | 1.8 | 1.9 | 1.9 | 1.9 | 2.0 |
| ML | Nm | 0.19 | 0.23 | 0.23 | 0.21 | 0.23 | 0.14 |
| Delta torque | Nm | 1.40 | 1.63 | 1.51 | 1.48 | 1.62 | 1.65 |

TABLE 3

Mechanical properties (150° C., t90)

| Example | | A | B | C | 1 | 2 | 3 |
|---|---|---|---|---|---|---|---|
| Hardness | IRHD | 73 | 77 | 75 | 75 | 79 | 78 |
| Tensile Strength | MPa | 27.0 | 26.8 | 26.1 | 26.3 | 26.6 | 26.2 |
| Elongation | % | 585 | 550 | 565 | 585 | 545 | 570 |
| Modulus 50% | MPa | 1.4 | 1.7 | 1.5 | 1.5 | 1.7 | 1.6 |
| Modulus 100% | MPa | 2.5 | 3.4 | 2.7 | 2.6 | 3.1 | 2.9 |
| Modulus 300% | MPa | 11.6 | 14.4 | 12.0 | 11.1 | 13.5 | 12.5 |
| Modulus 500% | MPa | 22.6 | 24.8 | 22.7 | 21.9 | 24.2 | 22.8 |
| Tear Strength | kN/m | 139 | 142 | 129 | 129 | 130 | 139 |
| Heat Build up (1 h,ΔT) | ° C. | 55 | 25 | 45 | 38 | 27 | 32 |
| Permanent Set | % | 31 | 16 | 28 | 26 | 17 | 25 |
| Blow out | min | 8 | 21 | 9 | 11 | 19 | 16 |
| Blow out temp. rise | ° C. | 56 | 82 | 59 | 74 | 73 | 80 |
| Fatigue to failure | kcy | 33 | 30 | 28 | 30 | 29 | 43 |
| Abrasion | mm³ | 181 | 168 | — | — | 154 | — |

TABLE 4

Mechanical properties (150° C., 60 min)

| Example | | A | B | C | 1 | 2 | 3 |
|---|---|---|---|---|---|---|---|
| Hardness | IRHD | 68 | 76 | 72 | 75 | 79 | 76 |
| Tensile Strength | MPa | 24.2 | 25.6 | 22.3 | 25.3 | 25.2 | 25.4 |
| Elongation | % | 620 | 455 | 550 | 560 | 485 | 505 |
| Modulus 50% | MPa | 1.1 | 1.9 | 1.3 | 1.5 | 1.9 | 1.7 |
| Modulus 100% | MPa | 1.8 | 4.0 | 2.2 | 2.6 | 3.7 | 3.0 |
| Modulus 300% | MPa | 8.6 | 16.7 | 10.1 | 11.6 | 15.2 | 13.6 |
| Modulus 500% | MPa | 18.3 | — | 20.0 | 22.1 | — | 24.5 |
| Tear Strength | kN/m | 84 | 118 | 87 | 95 | 110 | 111 |
| Heat Build up (1 h,ΔT) | ° C. | 55 | 24 | 45 | 28 | 24 | 26 |
| Permanent Set | % | 30 | 12 | 21 | 15 | 10 | 12 |
| Blow out | min | 9.5 | 30 | 10.5 | 20 | 44 | 32 |
| Blow out temp. rise | ° C. | 70 | 89 | 75 | 90 | 96 | 92 |
| Abrasion | mm³ | 186 | 171 | — | — | 158 | — |

TABLE 5

Mechanical properties (170° C., t90)

| Example | | A | B | C | 1 | 2 | 3 |
|---|---|---|---|---|---|---|---|
| Hardness | IRHD | 72 | 74 | 75 | 77 | 78 | 77 |
| Tensile Strength | MPa | 26.7 | 26.4 | 26.3 | 26.2 | 26.6 | 24.9 |
| Elongation | % | 590 | 535 | 565 | 585 | 560 | 565 |
| Modulus 50% | MPa | 1.4 | 1.7 | 1.5 | 1.5 | 1.7 | 1.5 |

TABLE 5-continued

Mechanical properties (170° C., t90)

| Example | | A | B | C | 1 | 2 | 3 |
|---|---|---|---|---|---|---|---|
| Modulus 100% | MPa | 2.4 | 3.3 | 2.7 | 2.5 | 3.0 | 2.6 |
| Modulus 300% | MPa | 10.9 | 13.9 | 11.9 | 10.8 | 12.7 | 11.5 |
| Modulus 500% | MPa | 21.8 | 24.7 | 22.6 | 21.6 | 23.3 | 21.8 |
| Tear Strength | kN/m | 123 | 140 | 129 | 123 | 149 | 133 |
| Heat Build up (1 h,ΔT) | ° C. | 50 | 27 | 45 | 38 | 29 | 31 |
| Permanent Set | % | 28 | 21 | 29 | 29 | 25 | 26 |
| Blow out | min | 10 | 19 | — | — | 17 | — |
| Blow out temp. rise | ° C. | 59 | 66 | — | — | 66 | — |
| Abrasion | mm³ | 190 | 178 | — | — | 168 | — |

TABLE 6

Mechanical properties (170° C., 30 min)

| Example | | A | B | C | 1 | 2 | 3 |
|---|---|---|---|---|---|---|---|
| Hardness | IRHD | 63 | 73 | 67 | 72? | 75? | 76 |
| Tensile Strength | MPa | 18.8 | 23.7 | 17.2 | 23.0 | 23.4 | 23.7 |
| Elongation | % | 615 | 485 | 520 | 565 | 505 | 525 |
| Modulus 50% | MPa | 0.9 | 1.6 | 1.1 | 1.3 | 1.6 | 1.5 |
| Modulus 100% | MPa | 1.3 | 3.2 | 1.8 | 2.1 | 2.9 | 2.7 |
| Modulus 300% | MPa | 6.3 | 14.5 | 8.0 | 9.9 | 12.9 | 12.4 |
| Modulus 500% | MPa | 14.5 | — | 16.4 | 19.7 | 23.0 | 22.3 |
| Tear Strength | kN/m | 40 | 80 | 85 | 73 | 81 | 90 |
| Heat Build up (1 h,ΔT) | ° C. | 56 | 30 | 50 | 34 | 24 | 26 |
| Permanent Set | % | 31 | 15 | 28 | 17 | 11 | 13 |
| Blow out | min | 7 | 25 | 9 | 23 | 42* | 25* |
| Blow out temp. rise | ° C. | 70 | 80 | 73 | 80 | 76 | 77 |

*No real blow-out could be detected, the samples were too compressed.

TABLE 7

Ageing properties (Hot air ageing, 3 days, 100° C.)
(vulcanization: 150° C., t90)

| Example | | A | B | C | 1 | 2 | 3 |
|---|---|---|---|---|---|---|---|
| Tensile Strength | MPa | 22.4 | 23.1 | 21.4 | 22.8 | 23.8 | 24.3 |
| Elongation | % | 495 | 415 | 470 | 460 | 440 | 465 |
| Modulus 50% | MPa | 1.9 | 2.7 | 2.0 | 2.3 | 2.6 | 2.5 |
| Modulus 100% | MPa | 3.6 | 5.8 | 3.8 | 4.3 | 5.2 | 4.9 |
| Modulus 300% | MPa | 14.2 | 19.1 | 14.2 | 15.6 | 17.7 | 17.1 |

TABLE 8

Ageing properties (Hot air ageing, 3 days, 100° C.)
(vulcanization: 150° C., 60 min)

| Example | | A | B | C | 1 | 2 | 3 |
|---|---|---|---|---|---|---|---|
| Tensile Strength | MPa | 20.1 | 20.8 | 18.7 | 21.1 | 21.6 | 21.2 |
| Elongation | % | 490 | 350 | 455 | 430 | 380 | 395 |
| Modulus 50% | MPa | 1.6 | 2.5 | 1.7 | 2.1 | 2.5 | 2.3 |
| Modulus 100% | MPa | 2.9 | 5.1 | 3.2 | 4.0 | 5.2 | 4.3 |
| Modulus 300% | MPa | 12.1 | 18.2 | 12.4 | 15.3 | 18.0 | 16.6 |

TABLE 9

Ageing properties (Hot air ageing, 3 days, 100° C.)
(vulcanization: 170° C., t90)

| Example | | A | B | C | 1 | 2 | 3 |
|---|---|---|---|---|---|---|---|
| Tensile Strength | MPa | 23.2 | 22.7 | 22.1 | 23.2 | 23.8 | 22.8 |
| Elongation | % | 495 | 405 | 465 | 435 | 445 | 450 |
| Modulus 50% | MPa | 1.9 | 2.7 | 2.2 | 2.4 | 2.5 | 2.5 |
| Modulus 100% | MPa | 3.6 | 5.7 | 4.2 | 4.7 | 5.2 | 4.7 |
| Modulus 300% | MPa | 14.6 | 18.6 | 15.0 | 16.9 | 17.7 | 17.0 |

TABLE 10

Ageing properties (Hot air ageing, 3 days, 100° C.)
(vulcanization: 170° C., 30 min)

| Example | | A | B | C | 1 | 2 | 3 |
|---|---|---|---|---|---|---|---|
| Tensile Strength | MPa | 17.3 | 18.1 | 16.8 | 18.8 | 19.3 | 20.3 |
| Elongation | % | 490 | 345 | 365 | 445 | 375 | 400 |
| Modulus 50% | MPa | 1.4 | 2.3 | 1.5 | 1.8 | 2.2 | 2.1 |
| Modulus 100% | MPa | 2.4 | 4.6 | 2.7 | 3.3 | 4.3 | 4.0 |
| Modulus 300% | MPa | 10.1 | 16.2 | 10.7 | 12.8 | 15.9 | 15.8 |

TABLE 11

Dynamic mechanical properties of the vulcanizates
(170° C./t90) obtained at 60° ± 1C and 15 Hz.

| Properties Examples | G', MPa | G", MPa | G*, MPa | Tan δ | J", 1/MPa |
|---|---|---|---|---|---|
| CONTROL (A) | 7.51 | 1.04 | 7.58 | 0.138 | 0.01810 |
| Si-69, 3 phr (B) | 6.49 | 0.82 | 6.54 | 0.126 | 0.01915 |
| Si-69, 1 phr BCI-MX, 1 phr (2) | 9.53 | 1.17 | 9.60 | 0.125 | 0.01280 |

TABLE 12

Dynamic mechanical properties of the vulcanizates
(170° C./30') obtained at 60° ± 1C and 15 Hz.

| Properties Examples | G', MPa | G", MPa | G*, MPa | Tan δ | J", 1/MPa |
|---|---|---|---|---|---|
| CONTROL (A) | 5.73 | 1.02 | 5.82 | 0.177 | 0.0300 |
| Si-69, 3 phr (B) | 7.01 | 1.02 | 7.08 | 0.145 | 0.0203 |
| Si-69, 1 phr BCI-MX, 1 phr (2) | 9.59 | 1.19 | 9.67 | 0.124 | 0.0129 |

TABLE 13

Dynamic mechanical properties of the vulcanizates
(150° C./t90) obtained at 60° ± 1C and 15 Hz.

| Properties Examples | G', MPa | G", MPa | G*, MPa | Tan δ | J", 1/MPa |
|---|---|---|---|---|---|
| CONTROL (A) | 8.66 | 1.09 | 8.73 | 0.126 | 0.0142 |
| Si-69, 3 phr (B) | 8.23 | 0.97 | 8.29 | 0.118 | 0.0141 |
| Si-69, 1 phr BCI-MX, 1 phr (2) | 10.06 | 1.16 | 10.13 | 0.115 | 0.0114 |

From the figures in the Tables 11–13, it is clearly seen that compound (2) exhibits better dynamic properties in terms of hysteresis behaviour than that of the compound containing Si-69, 3 phr (B). Some higher elastic response of compound (2) has been observed, this signifies better handling/cornering characteristics and improved irregular wear and speed.

Moreover, since the loss compliance (J") decreases significantly for compound (2), the rolling resistance is improved (15% reduction in loss parameters →6% reduction in rolling resistance →1% savings in fuel consumption).

TABLE 14

Percentage retention of torque at 150° C. during 8h curing

| Properties Examples | Torque Maximum | Torque at 8h | % retention |
|---|---|---|---|
| CONTROL (A) | 1.75 | 1.20 | 69 |
| Si-69, 3 phr (B) | 2.15 | 1.70 | 79 |
| Si-69, 1 phr BCI-MX, 1 phr (2) | 2.05 | 1.95 | 95 |

Examples 7–24 and Comparative Examples D–L

These examples demonstrate the application of the present invention in the so-called, "Green Tire" formulations found in European Patent application no. 0 501 227.

TABLE 15

Compound composition

| Example | | D | E | E' | E" | E''' |
|---|---|---|---|---|---|---|
| SBR Cariflex ™ S1215 | | 75.0 | 75.0 | 75.0 | 75.0 | 75.0 |
| BR Buna ™ CB 10 | | 25.0 | 25.0 | 25.0 | 25.0 | 25.0 |
| Silica KS 408 grs | | 80.0 | 80.0 | 80.0 | 80.0 | 80.0 |
| Stearic acid | | 2.0 | 2.0 | 2.0 | 2.0 | 2.0 |
| Zinc oxide | | 3.0 | 3.0 | 3.0 | 3.0 | 3.0 |
| Ar.oil Ingralen ® 150 | | 34.1 | 34.1 | 34.1 | 34.1 | 34.1 |
| Resin Colophonium | | — | — | 2.0 | 6.0 | 8.0 |
| Coupl. ag. Si-69 ® | | 6.4 | 6.4 | 2.1 | 2.1 | 2.1 |
| Permanax ® 6PPD | | 2.0 | 2.0 | 2.0 | 2.0 | 2.0 |
| Wax PEG ® 4000 | | 3.0 | 3.0 | 3.0 | 3.0 | 3.0 |
| Perkacit ® TBBS | | 1.7 | 1.0 | 1.0 | 1.0 | 1.0 |
| Perkacit ® DPG | | 2.0 | 2.0 | 2.0 | 2.0 | 2.0 |
| Sulfur | | 1.5 | 2.0 | 2.0 | 2.0 | 2.0 |
| Cure data at 170° C. | | | | | | |
| Delta torque | Nm | 2.4 | 2.5 | 2.6 | 2.1 | 2.0 |
| Scorch safety, ts2 | min. | 1.1 | 1.0 | 1.2 | 1.7 | 1.8 |
| Optimum cure time, t90 | min. | 8.2 | 8.3 | 7.0 | 8.2 | 7.8 |

TABLE 16

| Example | F | G | H | I | J |
|---|---|---|---|---|---|
| Compound composition | | | | | |
| SBR Cariflex ® S1215 | 75.0 | 75.0 | 75.0 | 75.0 | 75.0 |
| BR Buna ® CB 10 | 25.0 | 25.0 | 25.0 | 25.0 | 25.0 |
| Silica KS 408 grs | 80.0 | 80.0 | 80.0 | 80.0 | 80.0 |
| Stearic acid | 2.0 | 2.0 | 2.0 | 2.0 | 2.0 |
| Zinc oxide | 3.0 | 3.0 | 3.0 | 3.0 | 3.0 |
| Ar. oil Ingralen ® 150 | 34.1 | 34.1 | 34.1 | 34.1 | 34.1 |
| Resin Colophonium | 10.0 | 6.0 | 6.0 | — | — |
| Coupl. ag. Si-69 ® | 2.1 | 4.2 | 3.3 | — | 6.4 |
| Permanax ® 6PPD | 2.0 | 2.0 | 2.0 | 2.0 | 2.0 |
| Wax PEG ® 4000 | 3.0 | 3.0 | 3.0 | 3.0 | 3.0 |
| Perkacit ® TBBS | 1.0 | 1.0 | 1.0 | 1.0 | 1.7 |
| Perkacit ® DPG | 2.0 | 2.0 | 2.0 | 2.0 | 2.0 |
| Sulfur | 2.0 | 2.0 | 2.0 | 2.0 | 1.5 |
| Cure data at 170° C. | | | | | |
| Delta torque, Nm | 1.8 | 1.7 | 1.7 | 2.4 | 2.4 |
| Scorch safety, ts2, min. | 2.1 | 2.2 | 2.0 | 2.6 | 1.2 |
| Optimum cure time, t90, min. | 8.4 | 8.9 | 8.1 | 9.6 | 8.6 |

TABLE 17

| Example | K | 7 | 8 | 9 | 10 |
|---|---|---|---|---|---|
| Compound composition | | | | | |
| SBR Cariflex ® S1215 | 75.0 | 75.0 | 75.0 | 75.0 | 75.0 |
| BR Buna ® CB 10 | 25.0 | 25.0 | 25.0 | 25.0 | 25.0 |
| Silica KS 408 grs | 80.0 | 80.0 | 80.0 | 80.0 | 80.0 |
| Stearic acid | 2.0 | 2.0 | 2.0 | 2.0 | 2.0 |
| Zinc oxide | 3.0 | 3.0 | 3.0 | 3.0 | 3.0 |
| Ar. oil Ingralen ® 150 | 34.1 | 34.1 | 34.1 | 34.1 | 34.1 |
| Resin Colophonium | — | 2.0 | 6.0 | 8.0 | 10.0 |
| Coupl. ag. Si-69 ® | 6.4 | 2.1 | 2.1 | 2.1 | 2.1 |
| Permanax ® 6PPD | 2.0 | 2.0 | 2.0 | 2.0 | 2.0 |
| Wax PEG ® 4000 | 3.0 | 3.0 | 3.0 | 3.0 | 3.0 |
| Perkacit ® TBBS | 1.0 | 1.0 | 1.0 | 1.0 | 1.0 |
| Perkacit ® DPG | 2.0 | 2.0 | 2.0 | 2.0 | 2.0 |
| Sulfur | 2.0 | 2.0 | 2.0 | 2.0 | 2.0 |
| BCI-MX | 1.0 | 1.0 | 1.0 | 1.0 | 1.0 |
| Cure data at 170° C. | | | | | |
| Delta torque, Nm | 2.5 | 2.4 | 2.1 | 1.8 | 1.7 |
| Scorch safety, ts2, min. | 0.9 | 1.1 | 1.9 | 2.1 | 2.1 |
| Optimum cure time, t90, min. | 8.8 | 8.7 | 9.8 | 9.6 | 9.3 |

TABLE 18

| Example | 11 | 12 | L | 13 | 14 |
|---|---|---|---|---|---|
| Compound composition | | | | | |
| SBR Cariflex ® S1215 | 75.0 | 75.0 | 75.0 | 75.0 | 75.0 |
| BR Buna ® CB 10 | 25.0 | 25.0 | 25.0 | 25.0 | 25.0 |
| Silica KS 408 grs | 80.0 | 80.0 | 80.0 | 80.0 | 80.0 |
| Stearic acid | 2.0 | 2.0 | 2.0 | 2.0 | 2.0 |
| Zinc oxide | 3.0 | 3.0 | 3.0 | 3.0 | 3.0 |
| Ar. oil Ingralen ® 150 | 34.1 | 34.1 | 34.1 | 34.1 | 34.1 |
| Resin Colophonium | 6.0 | 6.0 | — | 6.0 | 6.0 |
| Coupl. ag. Si-69 ® | 4.2 | 3.3 | — | 2.1 | 3.3 |
| Permanax ® 6PPD | 2.0 | 2.0 | 2.0 | 2.0 | 2.0 |
| Wax PEG ® 4000 | 3.0 | 3.0 | 3.0 | 3.0 | 3.0 |
| Perkacit ® TBBS | 1.0 | 1.0 | 1.0 | 1.0 | 1.0 |
| Perkacit ® DPG | 2.0 | 2.0 | 2.0 | 2.0 | 2.0 |
| Sulfur | 2.0 | 2.0 | 2.0 | 2.0 | 2.0 |
| BCI-MX | 1.0 | 1.0 | 1.0 | 1.0 | 0.5 |
| Perkacit ® 267 | — | — | — | 0.5 | 0.5 |
| Cure data at 170° C. | | | | | |
| Delta torque, Nm | 1.8 | 2.0 | 2.0 | 2.2 | 2.1 |
| Scorch safety, ts2, min. | 2.0 | 1.5 | 1.8 | 1.4 | 1.4 |
| Optimum cure time, t90, min. | 8.3 | 7.2 | 8.8 | 6.4 | 6.1 |

TABLE 19

| Example | 15 | 16 | 17 | 18 | 19 |
|---|---|---|---|---|---|
| Compound composition | | | | | |
| SBR Cariflex ® S1215 | 75.0 | 75.0 | 75.0 | 75.0 | 75.0 |
| BR Buna ® CB 10 | 25.0 | 25.0 | 25.0 | 25.0 | 25.0 |
| Silica KS 408 grs | 80.0 | 80.0 | 80.0 | 80.0 | 80.0 |
| Stearic acid | 2.0 | 2.0 | 2.0 | 2.0 | 2.0 |
| Zinc oxide | 3.0 | 3.0 | 3.0 | 3.0 | 3.0 |
| Ar. oil Ingralen ® 150 | 34.1 | 34.1 | 34.1 | 34.1 | 34.1 |
| Resin Colophonium | 2.0 | 2.0 | 2.0 | 2.0 | 2.0 |
| Coupl. ag. Si-69 ® | 2.1 | 3.2 | 2.1 | 4.1 | 3.2 |
| Permanax ® 6PPD | 2.0 | 2.0 | 2.0 | 2.0 | 2.0 |
| Wax PEG ® 4000 | 3.0 | 3.0 | 3.0 | 3.0 | 3.0 |
| Perkacit ® TBBS | 1.0 | 1.0 | 1.0 | 1.0 | 1.0 |
| Perkacit ® DPG | 2.0 | 2.0 | 2.0 | 2.0 | 2.0 |
| Sulfur | 2.0 | 2.0 | 2.0 | 2.0 | 2.0 |
| BCI-MX | 0.5 | 0.5 | 0.5 | 0.5 | 0.5 |
| Vultac ® 710 | 0.5 | 0.5 | 0.5 | 0.5 | — |
| Cure data at 170° C. | | | | | |
| Delta torque, Nm | 2.7 | 2.0 | 2.6 | 2.7 | 2.5 |
| Scorch safety, ts2, min. | 1.2 | 1.4 | 1.2 | 1.2 | 1.0 |
| Optimum cure time, t90, min. | 6.9 | 8.8 | 6.5 | 7.7 | 7.3 |

TABLE 20

| Example | 20 | 21 | 22 | 23 | 24 |
|---|---|---|---|---|---|
| Compound composition | | | | | |
| SBR Cariflex ® S1215 | 75.0 | 75.0 | 75.0 | 75.0 | 75.0 |
| BR Buna ® CB 10 | 25.0 | 25.0 | 25.0 | 25.0 | 25.0 |
| Silica KS 408 grs | 80.0 | 80.0 | 80.0 | 80.0 | 80.0 |
| Stearic acid | 2.0 | 2.0 | 2.0 | 2.0 | 2.0 |
| Zinc oxide | 3.0 | 3.0 | 3.0 | 3.0 | 3.0 |
| Ar. oil Ingralen ® 150 | 34.1 | 34.1 | 34.1 | 34.1 | 34.1 |
| Resin Colophonium | 2.0 | 2.0 | 2.0 | 2.0 | 2.0 |
| Coupl. ag. Si-69 ® | 2.1 | 4.1 | 3.2 | 4.1 | 3.5 |
| Permanax ® 6PPD | 2.0 | 2.0 | 2.0 | 2.0 | 2.0 |
| Wax PEG ® 4000 | 3.0 | 3.0 | 3.0 | 3.0 | 3.0 |
| Perkacit ® TBBS | 1.0 | 1.0 | 1.0 | 1.0 | 1.0 |
| Perkacit ® DPG | 2.0 | 2.0 | 2.0 | 2.0 | 2.0 |
| Sulfur | 2.0 | 2.0 | 2.0 | 2.0 | 2.0 |
| BCI-MX | 0.5 | 0.5 | 0.5 | 0.5 | 0.5 |
| Vultac ® 710 | — | — | — | — | 0.5 |
| Perkacit ® 267 | — | — | 0.5 | 0.5 | — |
| Cure data at 170° C. | | | | | |
| Delta torque, Nm | 2.4 | 2.4 | 2.7 | 2.6 | 3.2 |
| Scorch safety, ts2, min. | 1.1 | 1.2 | 0.5 | 0.6 | 1.2 |
| Optimum cure time, t90, min. | 6.6 | 7.7 | 3.0 | 3.8 | 9.0 |

TABLE 21

Mechanical properties of the vulcanizates (170° C./20 min).

| Example | Modulus, MPa 100% | Modulus, MPa 300% | Tensile Strength MPa | Elon., % | HBU, 11 kg 25', ° C. | HBU, 22 kg 2 h, ° C. |
|---|---|---|---|---|---|---|
| D | 3.9 | 14.4 | 16.8 | 340 | 20 | — |
| E | 4.0 | 15.0 | 15.8 | 310 | 20 | 32 |
| 8 | 2.5 | 8.4 | 17.4 | 543 | — | — |
| 13 | 2.6 | 8.8 | 17.6 | 540 | — | — |
| 14 | 3.0 | 10.3 | 17.1 | 450 | — | — |
| 15 | 3.3 | 12.4 | 17.6 | 410 | — | — |
| 16 | 3.4 | 13.3 | 18.6 | 400 | 21 | — |
| 17 | 3.5 | 13.2 | 17.5 | 392 | 21 | — |
| 18 | 4.0 | 15.8 | 17.4 | 310 | 20 | — |
| 19 | 3.1 | 12.3 | 18.4 | 420 | 23 | — |
| 20 | 3.1 | 11.6 | 18.1 | 430 | 23 | — |
| 21 | 3.4 | 13.6 | 17.9 | 380 | 21 | — |
| 22 | 3.4 | 13.5 | 18.4 | 390 | 21 | — |
| 23 | 3.7 | 14.9 | 17.8 | 350 | 21 | — |
| 24 | 3.1 | 11.5 | 17.8 | 430 | — | — |

Examples 25–26 and Comparative Examples M–N

These examples demonstrate the applicablity of the present invention in a Green tire formulation which is similar to that of a commercially available Green tire.

TABLE 22

| Example | M | N | 25 | 26 |
|---|---|---|---|---|
| Natural Rubber SMR CV | 20.0 | 20.0 | 20.0 | 20.0 |
| SBR Cariflex ®S1215 | 50.0 | 50.0 | 50.0 | 50.0 |
| BR Buna ®CB10 | 30.0 | 30.0 | 30.0 | 30.0 |
| N-220 | 10.0 | 10.0 | 10.0 | 10.0 |
| Silica KS 408 gr | 50.0 | 60.0 | 60.0 | 60.0 |
| Stearic acid | 2.0 | 2.0 | 2.0 | 2.0 |
| ZnO | 3.0 | 3.0 | 3.0 | 3.0 |
| Ar oil Ingralen ® 150 | 12.0 | 15.0 | 15.0 | 15.0 |
| Resin Colophonium | — | — | 1.5 | 1.5 |
| Si-69 ® | 4.0 | 4.8 | 2.0 | 1.0 |
| Permanax ® 6PPD | 2.0 | 2.0 | 2.0 | 2.0 |
| Wax PEG ® 4000 | 3.0 | 3.0 | 3.0 | 3.0 |
| Perkacit ® TBBS | 1.0 | 1.0 | 1.0 | 1.0 |
| Perkacit ® DPG | 2.0 | 2.0 | 2.0 | 2.0 |
| Sulfur | 2.0 | 2.0 | 2.0 | 2.0 |
| BCI-MX | — | — | 0.5 | 0.5 |
| Vultac ® 710 | — | — | 0.5 | 0.5 |

TABLE 23

Physico-mechanical properties of the vulcanizates (170° C./20 min)

| Example | Mod., MPa 100% | Mod., MPa 300% | Tensile strength MPa | Elong. % | Tear str. KN/m | HBU 11 kg 1 h | HBU 22 kg h |
|---|---|---|---|---|---|---|---|
| M | 3.4 | 12.8 | 16.1 | 360 | 46 | 20 | 38 |
| N | 3.8 | 14.6 | 15.8 | 316 | 59 | 24 | 40 |
| 25 | 3.4 | 12.8 | 16.9 | 410 | 57 | 25 | 42 |
| 26 | 2.8 | 10.0 | 16.8 | 505 | 57 | — | — |

TABLE 24

Dynamic properties of the vulcanizates (170° C./20') at 0° C. and 1 Hz

| Example | G', MPa | G", MPa | G*, MPa | Tanδ | J" * 10⁻⁸ 1/Pa |
|---|---|---|---|---|---|
| M | 11.1 | 1.62 | 11.3 | 0.145 | 1.27 |
| N | 17.1 | 2.74 | 17.3 | 0.165 | 0.91 |
| 25 | 16.7 | 2.82 | 16.9 | 0.169 | 0.99 |
| 26 | 18.0 | 2.71 | 18.1 | 0.151 | 0.82 |

TABLE 25

Dynamic properties of the vulcanizates (170° C./20') at 60° C. and 15 Hz

| Example | G', MPa | G", MPa | G*, MPa | Tanδ | J" * 10⁻⁸ 1/Pa |
|---|---|---|---|---|---|
| M | 7.5 | 0.68 | 7.54 | 0.195 | 1.19 |
| N | 10.2 | 1.07 | 10.3 | 0.105 | 1.02 |
| 25 | 9.8 | 1.09 | 9.87 | 0.111 | 1.13 |
| 26 | 11.3 | 1.11 | 11.3 | 0.099 | 0.87 |

TABLE 26

Percentage retention of torque, (150° C./4h)

| Example | Torque, maxm. (Nm) | Torque, end (Nm) | % retention |
|---|---|---|---|
| N | 3.3 | 2.9 | 88 |
| 25 | 3.3 | 3.16 | 96 |

Examples 27 and Comparative Example O–P

Si-69 Replacement in Winter Tire Treads

In order to get better grip properties, the tread of winter tires generally contains a mixture of carbon black and silica. Because of the presence of silica, Si-69 coupling agent is used. Our objective was to replace Si-69 at a least partly by a mixture of Colophony resin and BCI-MX.

TABLE 27

Compound Composition

| Ingredients | O | P | 27 |
|---|---|---|---|
| NR SMR CV | 70 | 70 | 70 |
| BR Buna CB 10 | 30 | 30 | 30 |
| N-220-Black | 55 | 33 | 33 |
| KS 408gr-Silica | — | 22 | 22 |
| Zinc oxide | 5 | 5 | 5 |
| Stearic acid | 2 | 2 | 2 |
| Ar.oilDutrex729HP | 15 | 15 | 15 |
| Colophony resin | — | — | 3 |
| Si-69 ® | — | 3 | 1 |
| 6PPD | 2 | 2 | 2 |
| CBS | 1.2 | 1.2 | 1.2 |
| Sulfur | 1.2 | 1.2 | 1.2 |
| BCI-MX | — | — | 1.0 |
| Cure data obtained at 150° C. and 170° C. (parentheses) | | | |
| Extent of crosslinking, Nm | 1.24 (1.14) | 1.07 (0.93) | 0.93 (0.83) |
| Scorch safety, ts2, min | 5.8 (1.9) | 7.6 (2.2) | 8.1 (2.4) |

TABLE 27-continued

Compound Composition

| Ingredients | 0 | P | 27 |
|---|---|---|---|
| Opt. cure time, t90, min | 10.0 (3.0) | 16.5 (4.5) | 16.1 (4.1) |

TABLE 28 mechanical properties of the vulcanizates cured at 150° C. for t90 and 30 minutes (parentheses).

| Properties | | 0 | P | 27 |
|---|---|---|---|---|
| Modulus, MPa | 50% | 1.1 (1.1) | 1.0 (1.0) | 0.9 (0.9) |
| | 100% | 1.8 (1.7) | 1.5 (1.6) | 1.3 (1.3) |
| | 300% | 8.9 (8.7) | 6.8 (7.3) | 6.0 (6.1) |
| Tensile Strength, MPa | | 24.7 (24.1) | 24.7 (24.8) | 24.0 (23.9) |
| Elongation at break, % | | 610 (610) | 700 (690) | 760 (760) |

TABLE 29 mechanical properties of the vulcanizates cured at 170° C. for t90 and 20 minutes (parentheses).

| Properties | | 0 | P | 27 |
|---|---|---|---|---|
| Modulus, MPa | 50% | 1.1 (0.9) | 0.9 (0.9) | 0.9 (0.8) |
| | 100% | 1.7 (1.3) | 1.3 (1.3) | 1.2 (1.2) |
| | 300% | 7.9 (6.5) | 5.5 (5.1) | 4.6 (4.7) |
| Tensile strength, MPa | | 23.7 (21.4) | 21.6 (20.7) | 20.6 (20.9) |
| Elongation at break, % | | 640 (680) | 740 (665) | 750 (760) |

TABLE 30 mechanical properties of the aged (3 days 100° C.) vulcanizates cured at 150° C. for t90 and 30 minutes (parentheses).

| Properties | | 0 | P | 27 |
|---|---|---|---|---|
| Modulus, MPa | 50% | 1.6 (1.5) | 1.6 (1.7) | 1.5 (1.4) |
| | 100% | 2.9 (2.9) | 2.9 (3.1) | 2.6 (2.4) |
| | 300% | 13.1 (12.3) | 12.4 (12.9) | 10.9 (10.0) |
| Tensile strength, MPa | | 20.7 (17.0) | 20.6 (20.2) | 22.1 (21.1) |
| Elongation at break, % | | 460 (405) | 470 (445) | 530 (550) |

TABLE 31 mechanical properties of the aged (3 days 100° C.) vulcanizates cured at 170° C. for t90 and 20 minutes (parentheses).

| Properties | | 0 | P | 27 |
|---|---|---|---|---|
| Modulus, MPa | 50% | 1.6 (1.2) | 1.6 (1.4) | 1.1 (1.3) |

TABLE 31-continued mechanical properties of the aged (3 days 100° C.) vulcanizates cured at 170° C. for t90 and 20 minutes (parentheses).

| Properties | | 0 | P | 27 |
|---|---|---|---|---|
| | 100% | 2.9 (2.1) | 2.9 (2.4) | 2.5 (2.3) |
| | 300% | 13.2 (9.7) | 12.7 (10.2) | 10.4 (9.4) |
| Tensile strength, MPa | | 21.1 (16.5) | 20.0 (18.1) | 20.2 (18.9) |
| Elongation at break, % | | 450 (470) | 440 (470) | 530 (510) |

The foregoing examples were presented for the purpose of illustration and description only and are not to be construed as limiting the scope of the invention in any way. The scope of the invention is to be determined from the claims appended hereto.

What is claimed is:

1. A vulcanized rubber composition which comprises the vulcanization reaction product of:

A) 100 parts by weight of at least one natural or synthetic rubber;

B) 0.1 to 25 parts by weight of sulfur and/or a sufficient amount of a sulfur donor to provide the equivalent of 0.1 to 25 parts by weight of sulfur;

C) 10–100 parts by weight of at least one silica filler,

D) 0.1 to 5 parts by weight of at least one anti-reversion coagent represented by the general formula II:

$$Q_1-D-(Q_2)_p \qquad (II);$$

wherein D, optionally containing one or more groups selected from nitrogen, oxygen, silicon, phosphorus, boron, sulphone, sulphoxy, polysulfide and sulfur, is a monomeric or oligomeric divalent, trivalent or tetravalent group, p is an integer selected from 1, 2 or 3, $Q_1$ and $Q_2$ are independently selected from the formulas III and IV:

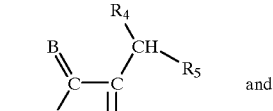

(III)

and

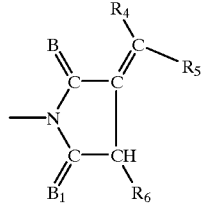

(IV)

wherein $R_4$, $R_5$ and $R_6$ are independently selected from hydrogen, $C_1$–$C_{18}$ alkyl groups, $C_3$–$C_{18}$ cycloalkyl groups, $C_6$–$C_{18}$ aryl groups, $C_7$–$C_{30}$ aralkyl groups and $C_7$–$C_{30}$ alkaryl groups and $R_5$ and $R_6$ may combine to form a ring when $R_4$ is hydrogen; B and $B_1$ are independently selected from oxygen and sulfur; and E) 0.1 to 25 parts by weight of at least one cure-improving resin to significantly increase the delta torque of the rubber composition during the vulcanization process as compared to the delta torque of a similar rubber composition in the absence of the cure-improving resin.

2. The vulcanized rubber composition of claim 1 which further comprises from 0.1–2.0 parts by weight of a silane coupling agent.

3. The vulcanized rubber composition of claim 1 which further comprises 0.1 to 25 parts by weight of at least one sulfide resin of the general formula $HZ_1\text{---}_nS_x\text{---}Z_3H$, wherein $Z_1$, $Z_2$, and $Z_3$ are independently selected from the group consisting of linear or branched $C_{1-8}$ alkylene groups, $C_{2-18}$ alkenylene groups, $C_{2-18}$ alkynylene groups, $C_{6-18}$ arylene groups, $C_{7-30}$ alkarylene groups, $C_{7-30}$ aralkylene groups, and $C_{3-18}$ cycloalkylene groups, wherein said groups optionally contain one or more hetero atoms, and are optionally substituted with hydroxy, amino, thiol, and halogen groups; each x is independently selected from an integer of 1 to 10; and n is an integer from 1 to 100.

4. The vulcanized rubber composition of claim 3 wherein the sulfide resin is of the formula (I)

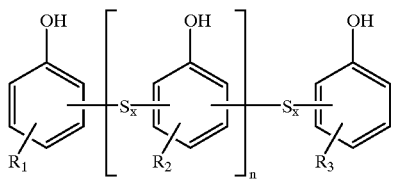

wherein $R_1$, $R_2$, and $R_3$ are independently selected form linear or branched $C_{1-10}$ alkyl groups, x is an integer of from 1–10 and n is an integer of from 1–100.

5. The vulcanized rubber composition of claim 1 wherein said cure-improving resin is selected from the group consisting of colophony and phenol/formaldehyde resins and wherein said cure-improving resin is employed in an amount of 0.1–25 parts by weight.

6. A process for the sulfur-vulcanization of a rubber composition which comprises the step of vulcanizing, with sulfur, a rubber composition comprising 10–100 parts of a silica filler, based on 100 parts of rubber, wherein said process is carried out in the presence of 0.1 to 5 parts by weight of at least one anti-reversion coagent comprising at least two groups selected from citraconimide and/or itaconimide groups; and an amount of at least one cure-improving resin effective to significantly increase the delta torque of the rubber composition during the vulcanization process as compared to the delta torque of a similar rubber composition in the absence of the cure-improving resin.

7. The process of claim 6 wherein the rubber composition further comprises from 0.1–2.0 parts weight of a silane coupling agent.

8. The process of claim 6 wherein said cure-improving resin is selected from the group consisting of colophony and phenol/formaldehyde resins and is employed in an amount of 0.1–25 parts by weight.

9. An article of manufacture which comprises vulcanized rubber made by the process of claim 6.

10. A method for replacing at least part of the amount of silane coupling agent employed in the sulfur vulcanization of a silane filled rubber composition which comprises using in said vulcanization process, a combination of at least one anti-reversion coagent comprising at least two groups selected from citraconimide and/or itaconimide groups; and a sufficient amount of at least one cure-improving resin to significantly increase the delta torque of the rubber composition during the vulcanization process as compared to the delta torque of a similar rubber composition in the absence of the cure-improving resin.

11. The vulcanized rubber composition of claim 1 wherein said cure-improving resin is selected from the group consisting of colophony and phenol/formaldehyde resins.

12. The process of claim 6 wherein said cure improving resin is selected from the group consisting of colophony and phenol/formaldehyde resins.

* * * * *

UNITED STATES PATENT AND TRADEMARK OFFICE
CERTIFICATE OF CORRECTION

PATENT NO. : 6,329,457 B1
DATED : December 11, 2001
INVENTOR(S) : Datta et al.

It is certified that error appears in the above-identified patent and that said Letters Patent is hereby corrected as shown below:

<u>Column 19,</u>
Line 31, "selected form" should read -- selected from --

Signed and Sealed this

Twenty-first Day of May, 2002

Attest:

Attesting Officer

JAMES E. ROGAN
Director of the United States Patent and Trademark Office